Sept. 14, 1937.　　　E. W. STACEY　　　2,092,816
EMBOSSING MACHINE
Filed June 11, 1936　　　7 Sheets-Sheet 4

INVENTOR
Ernest W. Stacey
By his attorney
Victor Cobb

Sept. 14, 1937.  E. W. STACEY  2,092,816
EMBOSSING MACHINE
Filed June 11, 1936  7 Sheets-Sheet 5

INVENTOR
Ernest W. Stacey
By his attorney
Victor Coble

Sept. 14, 1937.　　　　E. W. STACEY　　　　2,092,816
EMBOSSING MACHINE
Filed June 11, 1936　　　　7 Sheets-Sheet 6
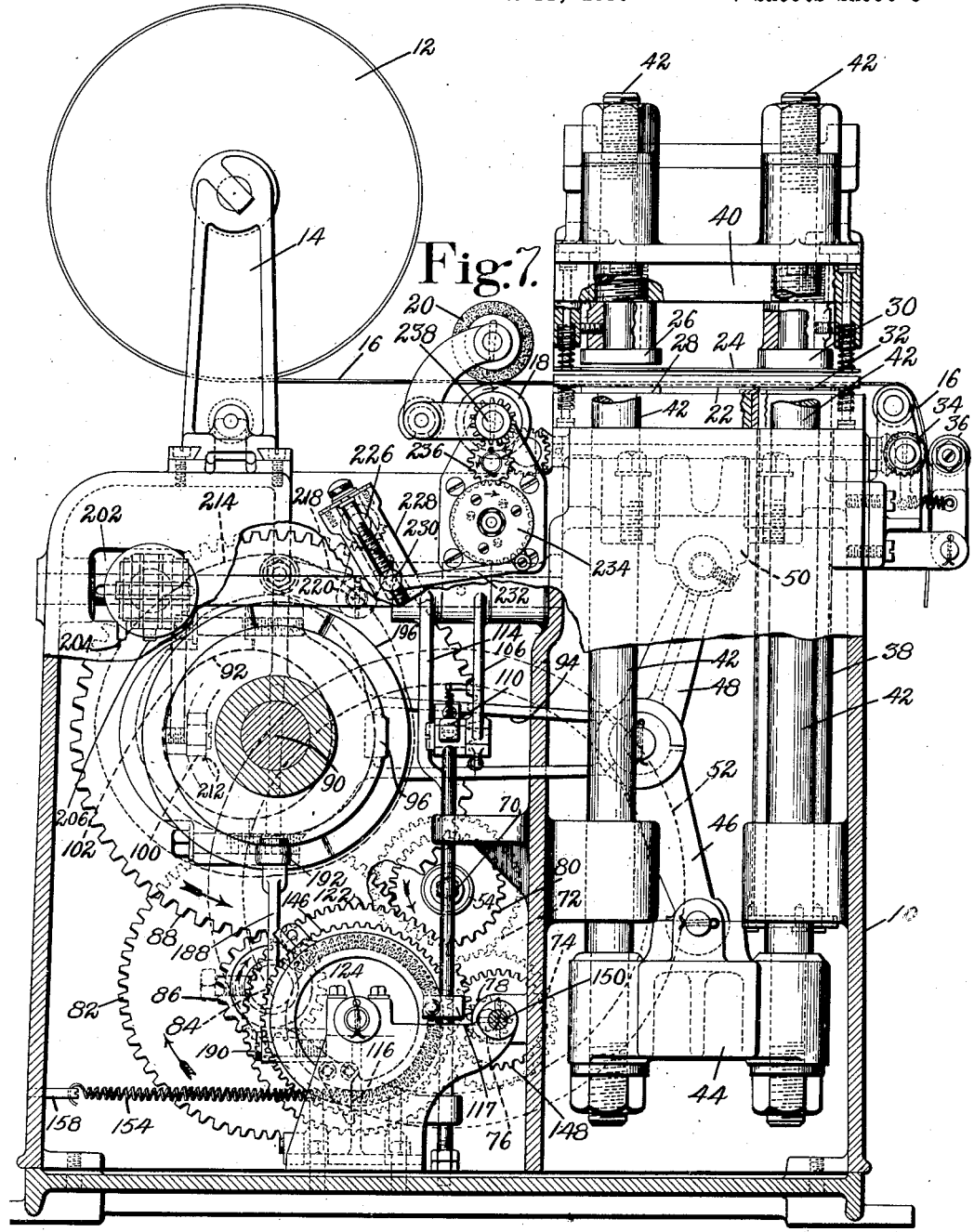
INVENTOR
Ernest W. Stacey
By his Attorney
Victor Cobb.

Sept. 14, 1937.   E. W. STACEY   2,092,816
EMBOSSING MACHINE
Filed June 11, 1936   7 Sheets-Sheet 7
Fig. 8.
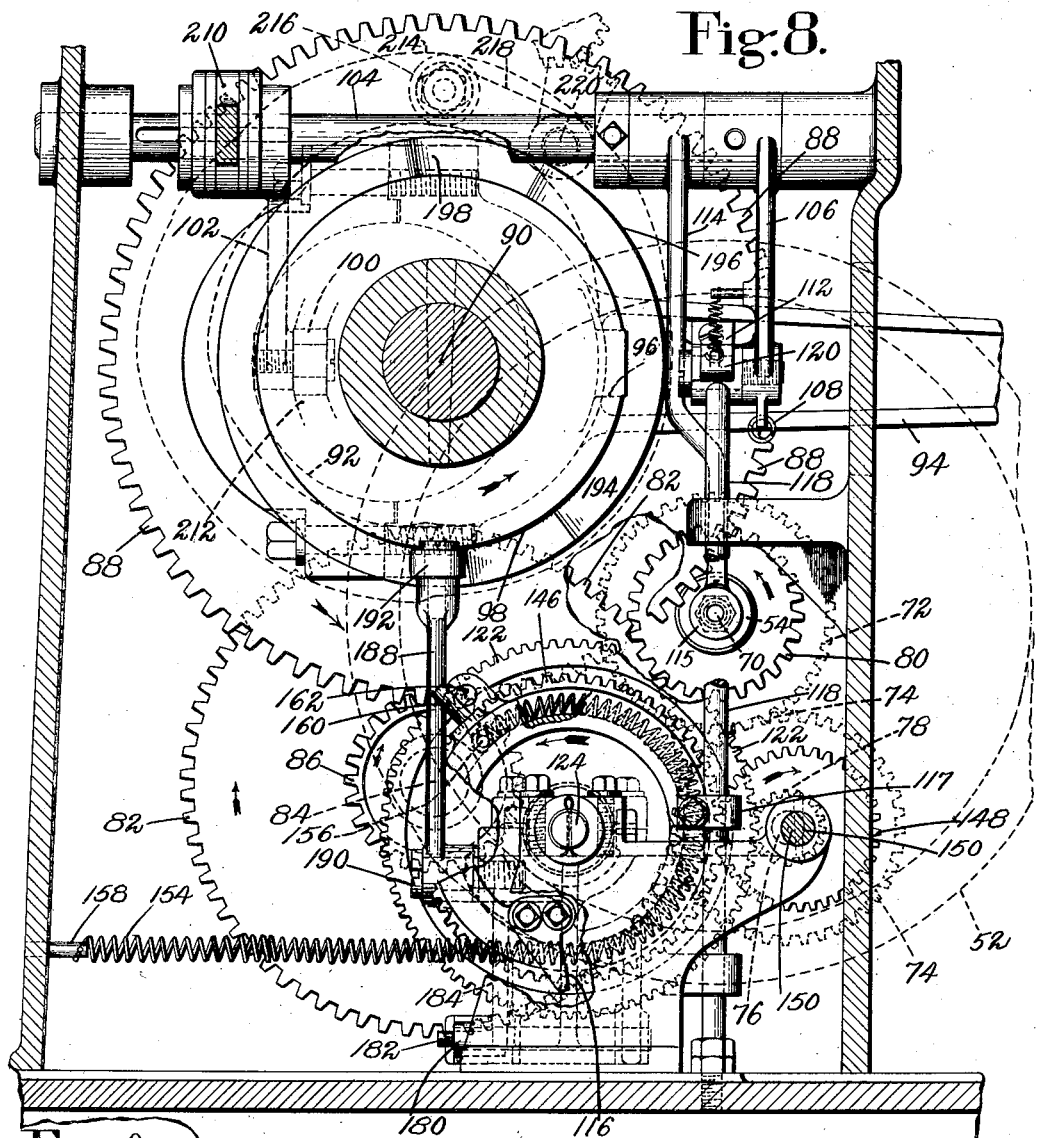
Fig. 9.
Fig. 10.
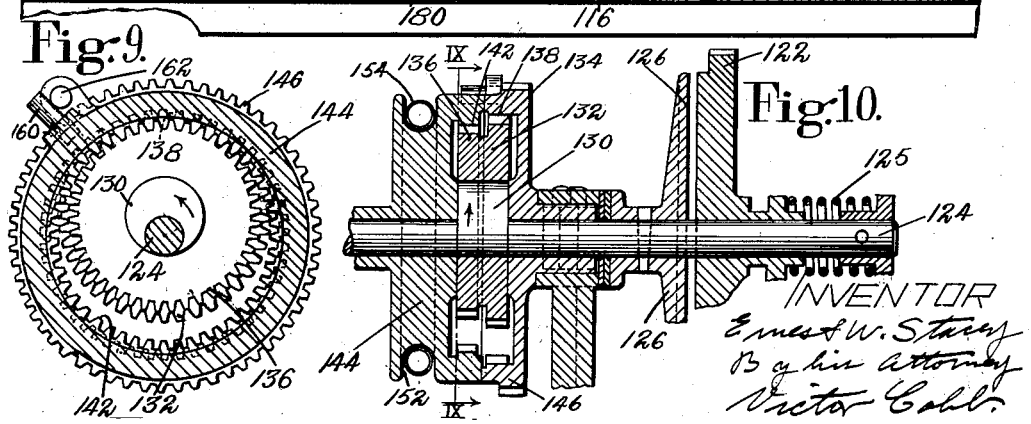
INVENTOR
Ernest W. Stacey
By his Attorney
Victor Gobl.

Patented Sept. 14, 1937

2,092,816

UNITED STATES PATENT OFFICE 2,092,816

EMBOSSING MACHINE

Ernest W. Stacey, Beverly, Mass., assignor to United Shoe Machinery Corporation, Paterson, N. J., a corporation of New Jersey Application June 11, 1936, Serial No. 84,709

13 Claims. (Cl. 101—3)

This invention relates to embossing machines and is illustrated as embodied in a machine for making ankle patches.

Ankle patches are small, generally circular, pieces of material which are stitched to the uppers of sport shoes, in such positions that they cover the protuberances caused by the ankle bones of the wearers of the shoes. Their object is to absorb the undue wear which occurs at such protuberant portions. They are generally made of rubber, though other materials may be used, and are often embossed with artistic designs or trade-marks.

Heretofore such articles have been made by placing a pile of sheets of the material used in a heavy dieing-out press and cutting out a corresponding number of the patches at once. The died-out patches are then carried to an embossing machine into which they are fed, one by one, by hand. When the patches are to be of rubber, semi-cured material is used, to facilitate the production of the desired effect by the embossing dies, and the died-out piles of patches are delivered by the dieing-out machine in a considerably adherent condition. Their separation for the action of the embossing machine involves the loss of considerable time.

A principal object of this invention is to provide a method and a machine for embossing and cutting out such articles which will avoid the difficulties mentioned. The invention contemplates embossing a design upon a piece of strip material at one station and then feeding the strip past the station toward a second station where the embossed portion is cut from the strip. In the machine shown, for practicing this method, the feed takes place in a number of intermittent movements, to permit convenient spacing of the embossing and cutting mechanisms, means being provided for accurate adjustment of the feeding movements so that the contemplated number of such movements will carry the work exactly from one station to the other.

In accordance with another feature of the invention, I have provided an automatic timing or delay mechanism in combination with the embossing means. I have found that different materials require different time intervals for the proper action of the embossing means, and have accordingly provided a machine which puts the work strip under embossing pressure and then automatically stops, with the embossing dies in operative position on the work, while the timing mechanism automatically runs for a predetermined interval, at the end of which the machine is again started, to release and feed the work strip. In the machine illustrated this timing mechanism comprises a clutch tripping member which moves from a resting position to a tripping position at uniform speed and is released and returned to resting position after it has tripped the clutch. The adjustment of the delay interval is effected by changing the resting position to vary the length of the path over which the member moves, when operative. The actuation and stopping of the timing mechanism are accomplished as matters ancillary to the automatic stopping and starting of the main drive of the machine, and the drive of the timing mechanism is independent of this main drive.

These and other features of the invention comprising certain combinations and arrangements of parts will be apparent from the following description of a preferred embodiment of the invention shown in the drawings, in which Fig. 1 is a front elevation of the machine;

Fig. 7 is a side elevation as seen from the left side of Fig. 1, with the casing broken away;

Fig. 8 is an enlarged view of the lower part of Fig. 7; and

Figs. 9 and 10 are details of the timing device, Fig. 9 being a section on the line IX—IX of Fig. 10.

Figure 1:
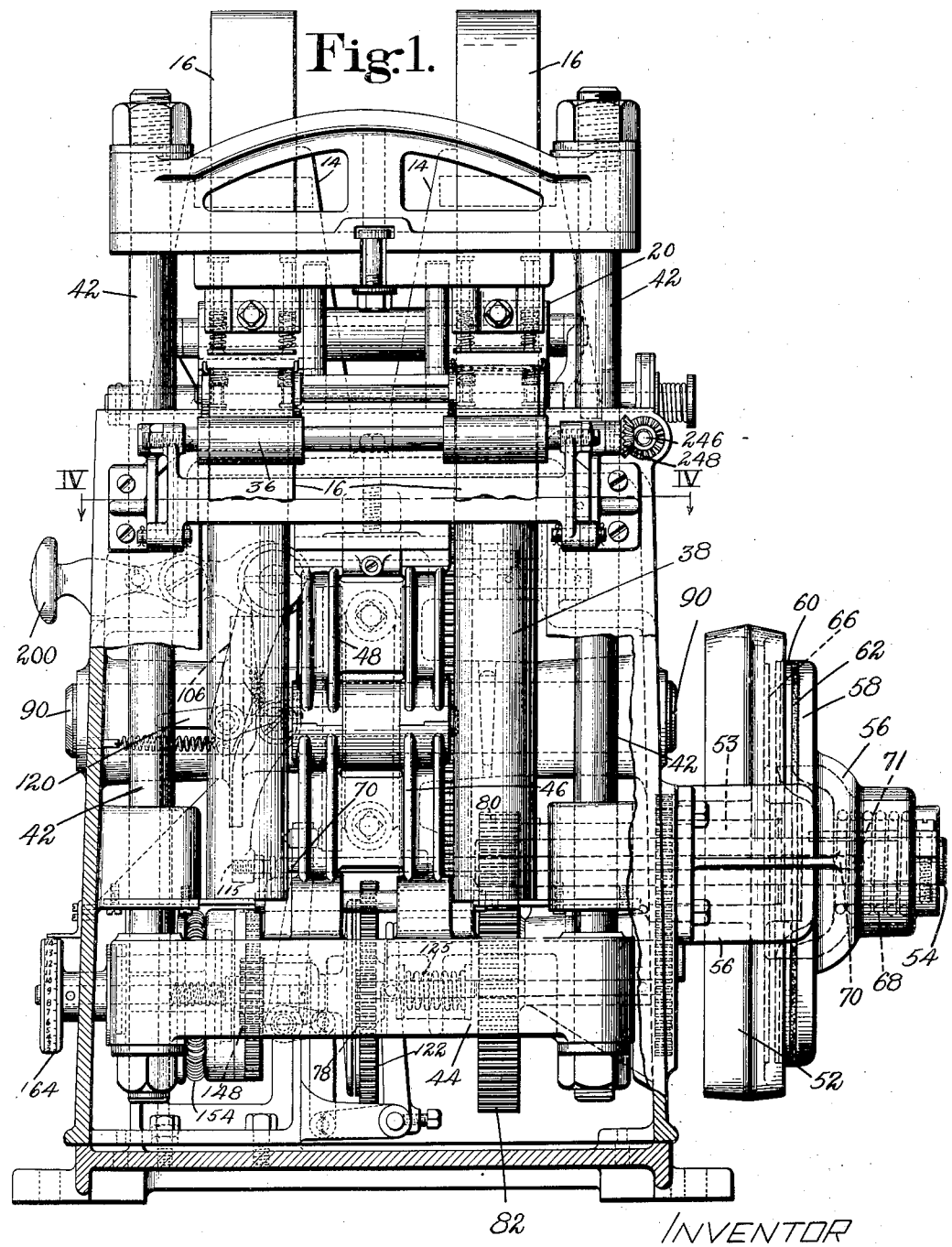

The frame of the machine is marked with the numeral 10. The machine is a twin machine as far as the work treating instrumentalities are concerned. At the top of the machine are twin rolls 12 supported in standards 14, on which strips of ribbon-like stock 16, from which the work is formed, is wound. Each ribbon 16 passes between two feed rolls 18, 20 and then between a pair of spring-biased stripper plates 22, 24, the lower of which is shaped as a shallow trough, so as to guide the ribbon. Each pair of stripper plates cooperates with a pair of embossing dies 26, 28 by which the work is embossed, and with a pair of punching dies 30, 32, between both which pairs the ribbon 16 is fed, afterward passing between two feed rolls 34, 36 to a waste container.

The work is embossed by the dies 26, 28 and when fed later between the punching dies 30, 32 the embossed patches are cut from the ribbon 16 and dropped into a tube 36, which is removable, when filled, to be used as a magazine in other machinery handling the patches. All four of the dies 26 and 30 are held in a head 40 which works vertically by means of four slide rods 42 set in a head 44. The head 44 is controlled by a toggle 46, 48, the upper member 48 of which is pivoted to a saddle 50 fixedly mounted on the machine frame 10.

Figure 3:
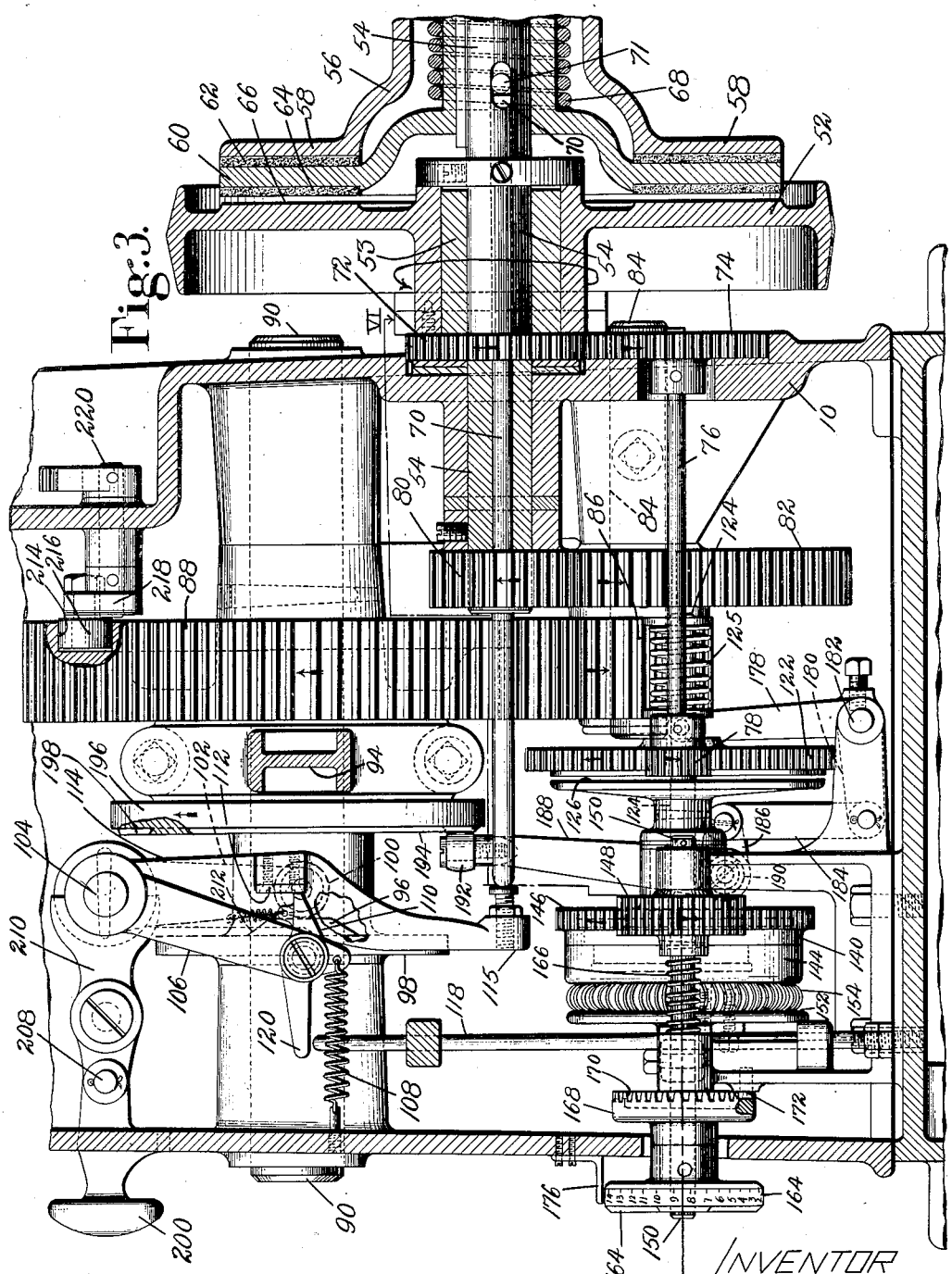
Fig. 3 is a cross-sectional elevation of the lower part of the machine on the line III—III of Fig. 4.
Figure 4:
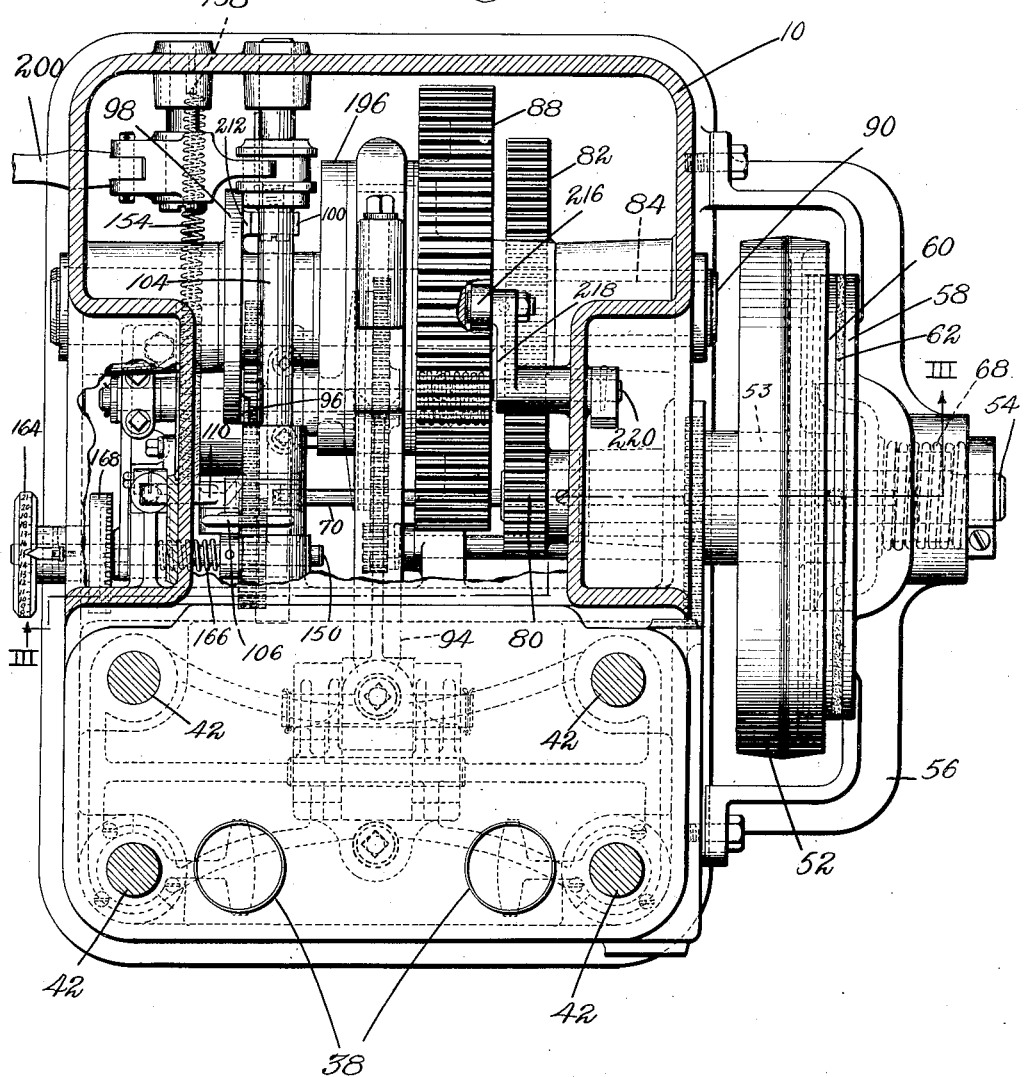
Fig. 4 is a cross-sectional plan view on the line IV—IV of Fig. 1.

The machine is run by a continuously driven pulley 52 rotatably mounted on a bushing 53 on a shaft 54 (Fig. 3) rotatably mounted in the frame 10. The shaft 54 is mounted at its outer end in a yoke 56 bolted to the frame 10 and carrying a circular brake flange 58. On the shaft 54 between the pulley 52 and the yoke 56 is splined a clutch disk 60 provided with brake bands 62, 64 on its opposite sides to engage the flange 58 and a friction surface 66 on the pulley 52, respectively. A spring 68 (Fig. 3) between the housing 56 and the disk 60 normally forces the surfaces 64, 66 together, so that the pulley 52 will drive the shaft 54. Such engagement is broken by pushing the rod 70 (Fig. 3) to the right. The rod 70 slides in a bore in the shaft 54 and has its right end (Fig. 3) abutting a pin 71 fastened to the disk 60 (Fig. 3).

The pulley 52 has bolted on its inner face a gear 72, which drives a gear 74 on a shaft 76 mounted in the machine frame 10. The shaft 76 carries a gear 78 at its left end (Fig. 3), the action of which will appear later. The elements 72, 74, 76, 78 rotate all the time that the pulley 52 is in rotation, whether the clutch 64, 66 is engaged or not. They drive the timing device, when it is in operation, as will be seen.

The shaft 54 has a gear 80 at its inner end which drives a gear 82 on a shaft 84 mounted in bearings on the frame 10. The gear 82 is centrally fastened to a smaller gear 86 which drives a large gear 88 pinned on a shaft 90 mounted in the frame 10. The shaft 90 carries an eccentric 92 (Figs. 7 and 8) which operates an eccentric strap 94 to make and break the toggle 46, 48.

When the machine is running it simultaneously operates the dies to die out a pair of already embossed patches at 30, 32 and to put embossing pressure on another pair of unsevered patches at 26, 28. The machine then stops temporarily, leaving the latter pair under pressure for a predetermined time, controlled by the timing device, and then starts again to break the toggle 46, 48, feed the ribbons 16 along, and straighten the toggle 46, 48 again, when it again stops as before. In the drawings the machine is shown in permanently stopped position, the mechanism for accomplishing which will be described later.

The temporary stopping of the machine is accomplished by a cam 96 on a disk 98 pinned to the shaft 90. The cam 96 (Fig. 3) is located on the nearer side of the disk 98 in Fig. 3 and pushes to the right a roll 100 on an arm 102 splined to a shaft 104 mounted in the frame 10 at right angles to the shafts 54, 76 and 90. The roll 100, in Fig. 3, is located beyond the shaft 90 and is struck by the cam 96 when the disk 98 occupies a position about 180° ahead of that shown in Fig. 3 (see Fig. 8). The shaft 104 has also pinned on it an arm 106 biased to the left (Fig. 3) by a spring 108 and having a pivoted dog 110 at its lower end. The right end of the dog 110 (Fig. 3) is spring-biased upwardly against a stop (not shown) on the arm 106. When the arms 102 and 106 are thrown to the right (Fig. 3) by the roll 100, the right end of the dog 110 abuts a surface 112 on a freely swinging arm 114 on the shaft 104 and moves it to the right. The end 115 of the arm 114 pushes the rod 70 to the right and disconnects the clutch 64, 66, as already described, and thus, through the brake 58, 62, stops the shaft 90 and the parts driven by it. When the timing device, which is still to be described, has gone through its cycle, a dog 116 carried by it pushes up a collar 117 fixed on a sliding rod 118 and moves the rod 118 up against the tail 120 of the dog 110, releasing the arm 114 and rod 70 and permitting the spring 68 to throw in the clutch 64, 66 again. The gear 88 and shaft 90 then go through a complete rotation, feeding the ribbons 16 along through a distance a little greater than the diameter of a work piece and the machine stops again as before, with a pair of work pieces under embossing pressure in the dies 26, 28. The timing device then operates again and the machine repeats its cycle as before.

The automatic timing device will now be described (see Figs. 9 and 10). The gear 78 (Fig. 3) on the continuously rotating shaft 76 meshes with a gear 122 slidable and rotatable relatively to a shaft 124 and spring-biased to the left (Figs. 3, 6, and 10) by a spring 125. The gear 122 has a clutch face cooperating with a clutch disk 126 mounted fixedly on the shaft 124. The shaft 124 has formed on it an eccentric 130 on which is rotatably carried a planetary gear 132 having two sets of gear teeth 134, 136 on it. The teeth 134 engage an internal gear 138 on a disk 140 and the teeth 136 engage another internal gear 142 on a disk 144, both disks being freely rotatable on the shaft 124. The disk 140 is also externally toothed at 146, the gear 146 engaging a smaller pinion 148 on a shaft 150, which for the moment is regarded as non-rotatable. The gears 134, 136 have the same number of teeth which are, however, of different diametral pitches in the two gears, and the internal gear 138 has one less tooth than the internal gear 142. The disk 140 and gear 146 being held from rotation by the shaft 150 and pinion 148, the rotation of the eccentric 130 by the clutch at 126 will roll the planetary gear 132, 134, 136 around inside the disks 140, 144, and the disk 144, because of the numerical tooth relationships above mentioned, will rotate slowly relatively to the fixed disk 140 in the counterclockwise direction as seen in Fig. 8. The dog 116 is mounted on the slowly rotating disk 144 and the interval during which the machine is held with the dies 26, 28 under pressure on the work depends on the angle through which the dog 116 has traveled from its starting position to the place where it strikes the rod 118.

Figure 6:
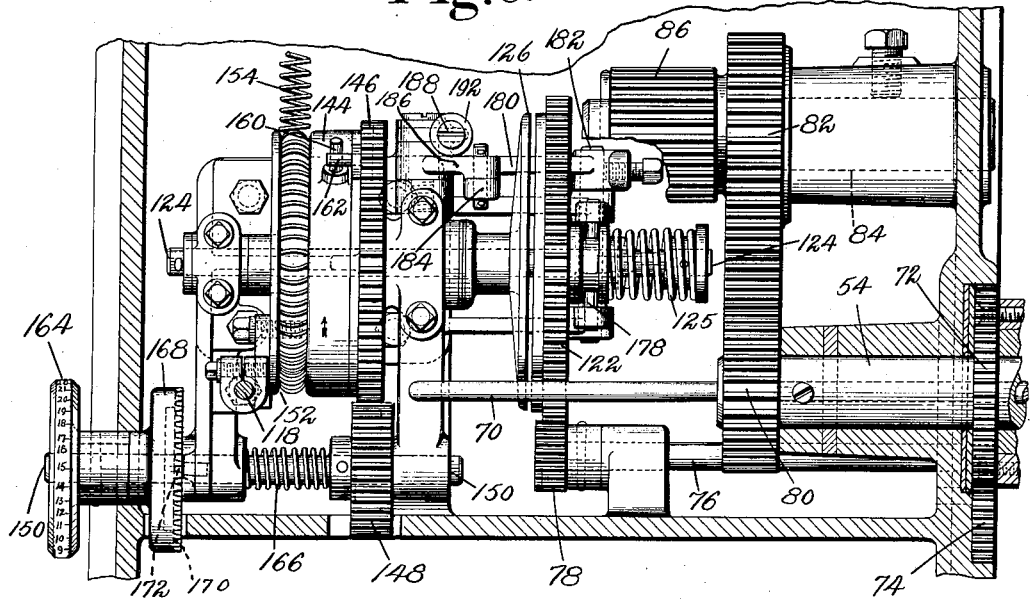
Fig. 6 is a sectional plan on the line VI—VI of Fig. 3.

This angle is predetermined as follows. The slowly rotating disk 144 has a groove 152 (Fig. 3) formed in it, in which is laid a long spiral spring 154 having one end fastened to the disk at 156 and the other end fastened to the frame 10 at 158. The spring 154 is strong enough to rotate the disk 144 unless something else is positively holding it. The disk 144 carries a pin 160 extending radially, and the disk 140 carries a pin 162 extending parallel to the shaft 124, and these pins are so positioned that they lie in each other's way and are normally held in engagement by the pull of the spring 154, as shown in Figs. 6 and 8. This engagement determines the starting point of the dog 116 and the arrangement is such that the slow rotation of the disk 144, which is in the counterclockwise direction (Figs. 7 and 8), carries the pin 160 away from the pin 162, stretching the spring 154. The position of the stop pin 162 is adjusted by turning the shaft 150 which rotates the disk 140 through the gears 146, 148. The shaft 150 is turned by a hand wheel 164 pinned to the shaft 150 which is slidable in the direction of its axis and is biased to the right (Figs. 3 and 6) by the spring 166. The hand wheel 164 is integral with a notched disk 168 the notches 170 in which are arranged to cooperate with a tooth 172 mounted fixedly on the frame 10. The hand wheel 164 is graduated in correspondence to the positions of the notches 170 and when pulled to the left in Fig. 3 can be turned to seat any one of the notches on the tooth 172 by aid of the index 176, thus turning the gear 146 and the pin 162 to any desired position. The spring 154 keeps the pin 160 in contact with the pin 162 at all times except when the shaft 124 is being driven, the disk 144 following the disk 140 in either direction when adjustment is being made by the hand wheel 164.

The clutch at 126 is normally kept in action by the spring 125 and is thrown out of action by a bell-crank lever 178, 180 pivoted at 182 on the frame 10 and connected by a link 184 to a second bell crank 186, 188 (Fig. 3) pivoted at 190 (Fig. 8) on the frame 10. The arm 188 carries a roll 192 which cooperates with a cam surface 194 (Fig. 3) on a disk 196 carried by the shaft 90. The cam surface 194 is of uniform height and extends completely around the disk 196 except for a depression 198 into which the roll 192 falls just before the shaft 90 stops temporarily, as described above. This fall enables the spring 125 to set the clutch 126 and start the timing device. When the rod 118 trips the dog 120 and starts the shaft 90, the cam 194 immediately operates the bell crank 186, 188 to break the clutch at 126 whereupon the spring 154 returns the disk 144 and dog 116 to their starting position as set by the hand wheel 164, with the pin 160 in contact with the pin 162.

The machine, which is shown in permanently stopped position, is started and stopped by means of a handle 200 which extends through a hole 202 (Fig. 7) in the side of the frame 10. The bottom edge of the hole has two notches 204, 206 (Fig. 7) in either of which the handle 200 may rest. When the handle 200 is lifted about its pivot 208 and moved to the left (Figs. 7 and 8) from the notch 206 to the notch 204, it moves the arm 102 with it, by virtue of a connection at 210 (Fig. 3) to the splined head of the arm, and shifts the cam roll 100 outside of and away from the circular path of a cam 212 on the disk 98 on which the roll 100 rests when the machine is permanently stopped. This shift of the cam roll 100 releases the clutch rod 70 and brings the roll 100 over the circular path of the cam 96 above discussed, also mounted on the disk 98 farther from its center than the cam 96 and about 180° from the cam 212, and the cam 96 actuates the roll 100, shaft 104, and arms 106 and 114 just as has been described above, stopping the machine once in each revolution with the dies 26, 28 and 30, 32 in engaged positions. At such time the depression 198 will engage the cam roll 192 so that the clutch 126 of the timing mechanism is engaged directly before the stop, and the machine operates as described above. When it is desired to shut down the machine, the handle 200 is moved to the notch 206, the cam 212 operates the clutch rod 70 and stops the machine with the dies separated, as shown in the drawings, and the machine remains stopped except for the shaft 76 and its allied parts, which rotates continuously with the drive pulley 52. The roll 192 is now riding on the cam 194 and holds the clutch at 126 open, so that the timing mechanism does not operate to start the machine again.

Figure 2:
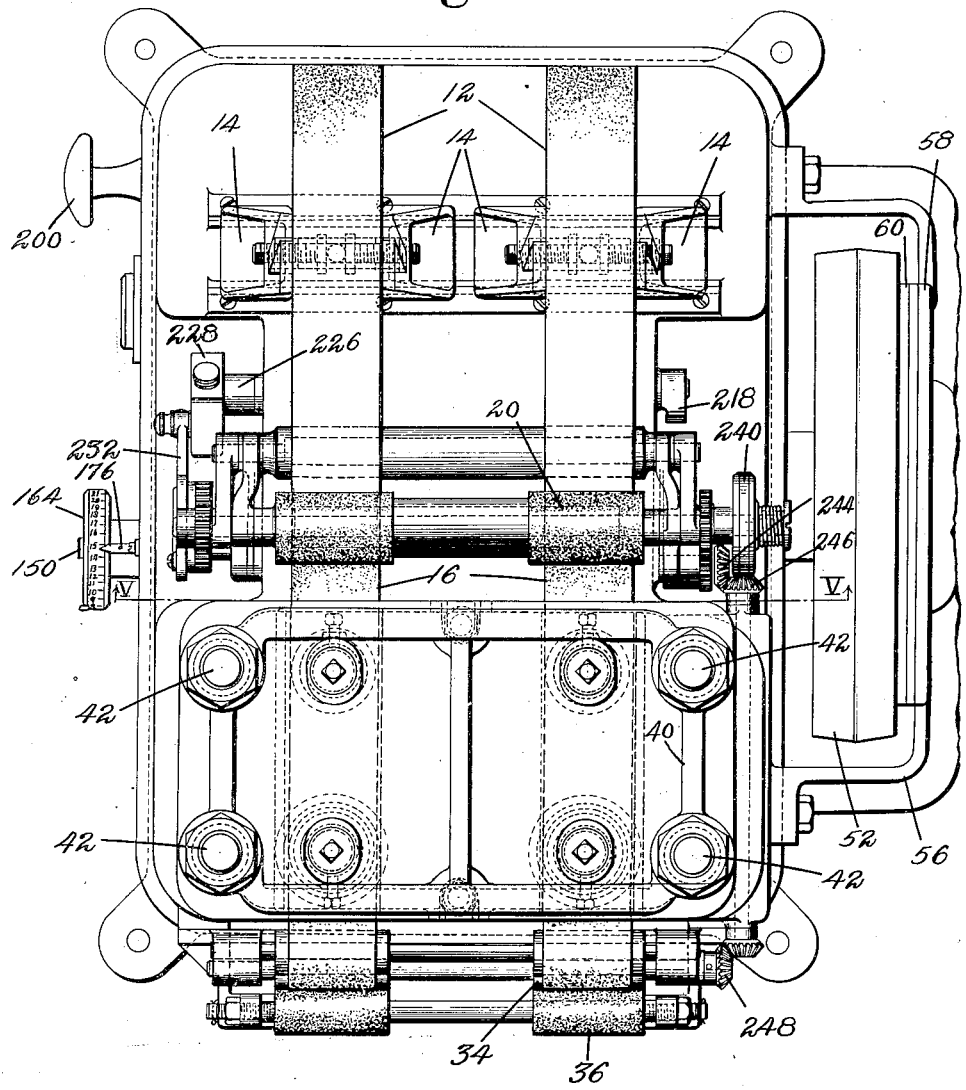
Fig. 2 is a plan view of the machine.
Figure 5:
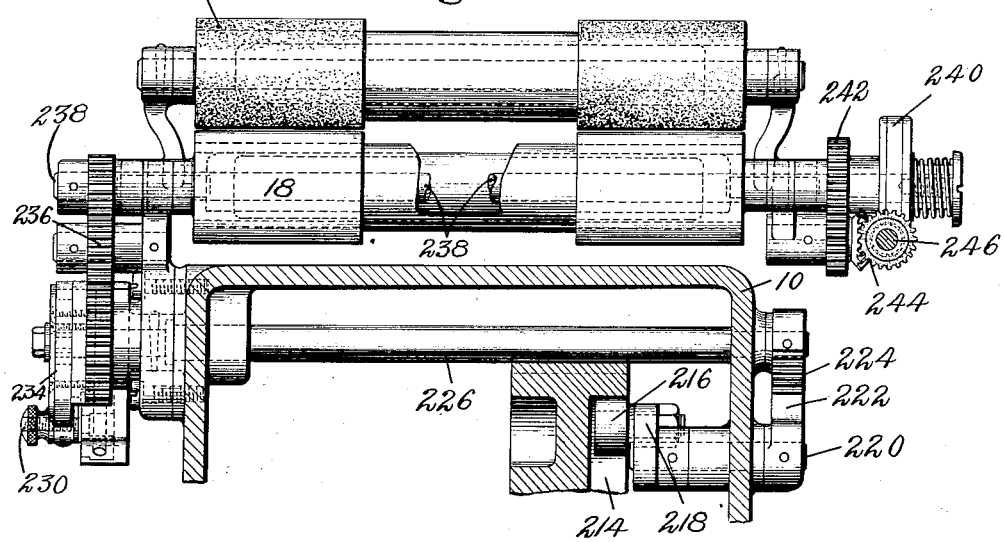
Fig. 5 is a cross-sectional elevation on the line V—V of Fig. 2.

The feed of the ribbons 16 is accomplished as follows. The gear 88 has a cam track 214 in its side face (Figs. 3 and 5) which operates a roll 216 on the arm 218 of a bell crank pivoted at 220 on the frame 10. The other arm 222 of the bell crank has a gear segment 224 at its outer end which meshes with a similar segment on a shaft 226 which carries on its other end a block 228 (Fig. 7) having an adjustable connection 230 to one end of a link 232, the other end of which actuates a clutch 234 of the wedging roll type with a toothed periphery on its casing to give step-by-step rotation to a gear 236 which drives a gear on the axis 238 of the rolls 18. The shaft 238, through a slip friction clutch 240 (Fig. 5), drives gearing 242, 244 and a shaft 246 which drives the rolls 34 by means of a miter gear 248 (Figs. 1 and 2). The gearings are so designed that the rolls 34 drive a trifle faster than the rolls 18, thus keeping the ribbons 16 taut, the slip clutch 240 absorbing the discrepancy in the movements. The amount of ribbon 16 fed at each cycle of the machine is regulated by the connection at 230. The time necessary for the embossing dies to do their work depends on the nature of the work and of the dies, and is found by experimentation. Inasmuch as there is a fixed relation between the velocity of the dog 116 and the speed of the pulley 52, accurate adjustment of the delay time is possible.

Having described my invention, what I claim as new and desire to secure by Letters Patent of the United States is:

1. In a machine of the class described, an embossing mechanism located at a station, a cutting mechanism located at another station, a work holder arranged to hold a roll of strip material located on the line joining the two said stations, an intermittent feed mechanism arranged to feed said strip material past the two said stations, mechanism for actuating the embossing and cutting mechanism during the dwell in the intermittent feed, the feeding movement of said intermittent feed being arranged to move the strip from the embossing station to the cutting station in an exact integral number of feeding movements, and a continuously adjustable timing mechanism constructed and arranged automatically to control the duration of the dwell in the intermittent feed, to permit the embossing mechanism to act on the strip during a predetermined time, said timing mechanism comprising a duration adjusting member the adjusting movement of which is proportional to the change in duration produced thereby.

2. In a machine of the class described, a main drive shaft, a work treating mechanism, a one revolution clutch located between said shaft and said treating mechanism, a mechanism for reengaging said clutch a predetermined time after its disconnection comprising a second clutch connected to said shaft, means for engaging said second clutch at the time said first-named clutch is disengaged, a member for causing the first-named clutch to engage, and a member for actuating said member and driven by said second-named clutch.

3. In a machine of the class described, a main drive shaft, a work treating mechanism, a one revolution clutch located between said shaft and said treating mechanism, a mechanism for reengaging said clutch a predetermined time after its disconnection comprising a second clutch connected to said shaft, means for engaging said second clutch at the time said first-named clutch is disengaged, a member for causing the first-named clutch to engage, a member for actuating said first-named member and driven by said second-named clutch, said second-named member being driven continuously at uniform velocity in the same direction by said second-named clutch from its starting position until it strikes the first-named member, and means for adjusting the starting position of said second-named member to predetermine the time interval during which it moves to strike the first-named member.

4. In a machine of the class described, a main drive shaft, a work treating mechanism, a one revolution clutch located between said shaft and said treating mechanism, a mechanism for reengaging said clutch a predetermined time after its disconnection comprising a second clutch connected to said shaft, means for engaging said second clutch at the time said first-named clutch is disengaged, a member for causing the first-named clutch to engage, a second member for actuating said first-named member and driven by said second-named clutch, and means for disengaging said second-named clutch after the said first-named clutch has been caused to reengage said first-named member.

5. In a machine of the class described, a work treating mechanism, a main drive shaft, a clutch between said shaft and said mechanism, mechanism to disconnect said clutch at a predetermined time after the clutch engages, a second clutch driven by said shaft, means for engaging said second clutch just prior to the disconnection of said first-named clutch, a member driven by said second clutch when operative and arranged to reinstate said first-named clutch in operation at a certain point in its path, means for disconnecting said second clutch after said first-named clutch has been so reinstated, and means for then restoring said member to its starting position.

6. In a machine of the class described, a work treating mechanism, a main drive shaft, a clutch between said shaft and said mechanism, mechanism to disconnect said clutch at a predetermined time after the clutch engages, a second clutch driven by said shaft, means for engaging said second clutch just prior to the disconnection of said first-named clutch, a member driven by said second clutch when operative and arranged to reinstate said first-named clutch in operation at a certain point in its path, means for disconnecting said second clutch after said first-named clutch has been so reinstated, means for then restoring said member to its starting position, and means for varying the starting position of said member to vary the length of its path.

7. In a machine of the class described, a work treating mechanism, a main drive shaft, a clutch between said shaft and said mechanism, mechanism to disconnect said clutch at a predetermined time after the engagement of the clutch, a second clutch driven by said shaft, means for engaging said second clutch prior to the disconnection of said first-named clutch, a member under the influence of a restoring force driven by said second clutch when operative and arranged to reinstate said first-named clutch in operation at a certain point in its path, and means for disconnecting said second clutch after said first-named clutch has been so reinstated.

8. In a machine of the class described, a work treating mechanism, a main drive shaft, a clutch between said shaft and said mechanism, mechanism to disconnect said clutch at a predetermined time after the starting of the machine, a second clutch driven by said shaft, means for engaging said second clutch prior to the disconnection of said first-named clutch, a member driven by said second clutch when operative and arranged to reinstate said first-named clutch in operation at a certain point in its path, means for disconnecting said second clutch after said first-named clutch has been so reinstated, means for then restoring said member to its starting position, and means for predetermining said starting position.

9. In a machine of the class described, a main shaft, a main clutch driven thereby, mechanism for automatically terminating the action of said clutch at a predetermined time after the machine has started, a second clutch driven by said shaft, mechanism for automatically putting said second clutch into operation just prior to the termination of the action of the main clutch, a member driven by said second clutch, an abutment occupying a normally fixed position, said member having also an abutment, means for exerting a restoring force upon said second member to bring the abutment on said second member into contact with the first-named abutment in a direction opposite to that in which said member is driven, a second member constructed and arranged to restore said main clutch to operative condition, and lying in the path of said first-named member when said first-named member is moved by said second clutch, means for adjusting the normally fixed position of said first-named abutment, and means for terminating the action of said second clutch as soon as the main clutch has been reinstated in operation.

10. In a machine of the class described, a pair of embossing dies, a main drive element, a single revolution main clutch operated thereby, mechanism operated by the main clutch to open and close the dies once in each revolution of the clutch, a second clutch, one member of which is continuously driven by the main drive element irrespective of the main clutch, a shaft operated by the other member of the second clutch, mechanism for putting said second clutch into operation just prior to the going out of operation of the main clutch, a reduction gearing driven by the second clutch, an element arranged to trip the main clutch, and a second element driven by said reduction gearing and arranged to operate said main clutch tripping element at a fixed point in the path of said second element.

11. In a machine of the class described, a pair of embossing dies, a main drive element, a single revolution main clutch operated thereby, mechanism operated by the main clutch to open and close the dies once in each revolution of the clutch, a second clutch, one member of which is continuously driven by the main drive element irrespective of the main clutch, a shaft operated by the other member of the second clutch, mechanism for putting said second clutch into operation just prior to the going out of operation of the main clutch, a reduction gearing driven by the second clutch, an element arranged to trip the main clutch, a second element driven by said reduction gearing and arranged to operate said main clutch tripping element at a fixed point in the path of said second element, and means for adjusting the starting position of the said second element to determine the time interval during which it moves before operating the said clutch tripping element.

12. In a machine of the class described, a pair of embossing dies, a main drive element, a single revolution main clutch operated thereby, mechanism operated by the main clutch to open and close the dies once in each revolution of the clutch, a second clutch, one member of which is continuously driven by the main drive element irrespective of the main clutch, a shaft operated by the other member of the second clutch, mechanism for putting said second clutch into operation just prior to the going out of operation of the main clutch, a reduction gearing driven by the second clutch, an element arranged to trip the main clutch, a second element driven by said reduction gearing and arranged to operate said main clutch tripping element at a fixed point in the path of said second element, and mechanism operated by the main clutch, immediately after the clutch becomes operative, for disconnecting the elements of the second clutch.

13. In a machine of the class described, a pair of embossing dies, a main drive element, a single revolution main clutch operated thereby, mechanism operated by the main clutch to open and close the dies once in each revolution of the clutch, a second clutch, one member of which is continuously driven by the main drive element irrespective of the main clutch, a shaft operated by the other member of the second clutch, mechanism for putting said second clutch into operation just prior to the going out of operation of the main clutch, an internal gear rotatably mounted on said shaft, a second internal gear rotatably mounted on said shaft, the first said internal gear being normally motionless and carrying a projecting stop, mechanism for turning the first said internal gear to adjust the position of its stop, a second stop mounted on the second said internal gear and arranged, when said second internal gear is sufficiently located on the shaft, to collide with said first-named stop, a force exerting member arranged to effect the said sufficient rotation, a planetary gear driven by said shaft and meshing with both said internal gears, the three said gears being designed to effect a rotation of said second internal gear at lower speed than that of the shaft and in a direction contrary to that of the said sufficient rotation, an element arranged to trip the main clutch, and an abutment on said second-named internal gear arranged at a certain point in its path to operate said last-named element to trip the main clutch.

ERNEST W. STACEY.